United States Patent
Cotado et al.

(10) Patent No.: US 11,087,504 B2
(45) Date of Patent: Aug. 10, 2021

(54) TRANSFORMING GRAYSCALE IMAGES INTO COLOR IMAGES USING DEEP NEURAL NETWORKS

(71) Applicant: Google LLC, Mountain View, CA (US)

(72) Inventors: Sergio Guadarrama Cotado, Berkeley, CA (US); Jonathon Shlens, San Francisco, CA (US); David Bieber, Mountain View, CA (US); Mohammad Norouzi, Richmond Hill (CA); Kevin Patrick Murphy, Palo Alto, CA (US); Ryan Lienhart Dahl, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 100 days.

(21) Appl. No.: 16/494,386

(22) PCT Filed: May 21, 2018

(86) PCT No.: PCT/US2018/033676
§ 371 (c)(1),
(2) Date: Sep. 16, 2019

(87) PCT Pub. No.: WO2018/213829
PCT Pub. Date: Nov. 22, 2018

(65) Prior Publication Data
US 2020/0098144 A1    Mar. 26, 2020

Related U.S. Application Data

(60) Provisional application No. 62/508,874, filed on May 19, 2017.

(51) Int. Cl.
*G06T 11/00* (2006.01)
*G06T 3/40* (2006.01)

(52) U.S. Cl.
CPC .............. *G06T 11/001* (2013.01); *G06T 3/40* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS 3,706,841 A    12/1972 Novak
4,755,870 A     7/1988 Markle et al.
(Continued)

FOREIGN PATENT DOCUMENTS

CN    102214364 A    * 10/2011

OTHER PUBLICATIONS

B. Karlik and M. Sariöz, "Coloring gray-scale image using artificial neural networks," 2009 2nd International Conference on Adaptive Science & Technology (ICAST), 2009, pp. 366-371, doi: 10.1109/ICASTECH.2009.5409700. (Year: 2009).*
(Continued)

*Primary Examiner* — Justin P. Misleh
(74) *Attorney, Agent, or Firm* — Fish & Richardson P.C.

(57) ABSTRACT

Systems and methods for transforming grayscale images into color images using deep neural networks are described. One of the systems include one or more computers and one or more storage devices storing instructions that, when executed by one or more computers, cause the one or more computers to implement a coloring neural network, a refinement neural network, and a subsystem. The coloring neural network is configured to receive a first grayscale image having a first resolution and to process the first grayscale image to generate a first color image having a second resolution lower than the first resolution. The subsystem processes the first color image to generate a set of interme-
(Continued)

diate image outputs. The refinement neural network is configured to receive the set intermediate image outputs, and to process the set of intermediate image outputs to generate a second color image having a third resolution higher than the second resolution.

18 Claims, 3 Drawing Sheets

(56) References Cited

U.S. PATENT DOCUMENTS

| | | | |
|---|---|---|---|
| 7,620,265 | B1 | 11/2009 | Wolff et al. |
| 2019/0279402 | A1* | 9/2019 | Panetta ............... G06T 7/10 |

OTHER PUBLICATIONS

Nguyen, T.D., Mori, K., Thawonmas, R.: Image colorization using a deep convolutional neural network. CoRR abs/1604.07904 (2016) (Year: 2016).*
D. Varga and T. Szirányi, "Fully automatic image colorization based on Convolutional Neural Network," 2016 23rd International Conference on Pattern Recognition (ICPR), 2016, pp. 3691-3696, doi: 10.1109/ICPR.2016.7900208. (Year: 2016).*
A. Royer, A. Kolesnikov, and C. H. Lampert. Probabilistic Image Colorization. CoRR abs/1705.04258, May 2017. (Year: 2017).*
M. Darweesh, M. AlZubaidi, A. Kunhu, H. Al-Ahmad and F. Taher, "Colorization of gray scale natural still images by using ANN to predict the low frequency DCT components of the RGB channels," 2015 International Conference on Information and Communication Technology Research (ICTRC), 2015, pp. 306-309 (Year: 2015).*
Z. Cheng, Q. Yang and B. Sheng, "Deep Colorization," 2015 IEEE International Conference on Computer Vision (ICCV), 2015, pp. 415-423, doi: 10.1109/ICCV.2015.55. (Year: 2015).*
PCT International Preliminary Report on Patentability in the International Appln. No. PCT/US2018/033676, dated Nov. 19, 2019, 8 pages.
Cao et al, "Unsupervised diverse colorization via generative adversarial networks," arXiv, Jul. 1, 2017, 16 pages.
Charpiat et al, "Automatic image colorization via multimodal predictions," in European Conference on Computer Vision (ECCV), 2008, 14 pages.
Clevert et al, "Fast and accurate deep network learning by exponential linear units (ELUs)," in International Conference on Learning Representations, Feb. 2016, 14 pages.
Deshpande et al, "Learning diverse image colorization," arXiv, Apr. 27, 2017, 12 pages.
Deshpande et al, "Learning large-scale automatic image colorization," in International Conference on Computer Vision (ICCV), 2015, 9 pages.
Goodfellow et al, "Generative adversarial networks," in Conference on Neural Information Processing Systems (NIPS), 2014, 9 pages.
He et al, "Deep residual learning for image recognition," in Conference on Computer Vision and Pattern Recognition (CVPR), arXiv, Dec. 10, 2015, 12 pages.
Hwang et al, "Image colorization with deep convolutional neural networks," Stanford University Tech. Rep. 2016, 7 pages.
Iizuka et al, "Let there be color: joint end-to-end learning of global and local image priors for automatic image colorization with simultaneous classification" ACM Transactions on Graphics, 2016, 11 pages.
Isola et al, "Image-to-image translation with conditional adversarial networks," arXiv, Nov. 26, 2018, 17 pages.
Kingma et al, Adam: A method for stochastic optimization, arXiv, Jan. 20, 2017, 15 pages.
Kingma et al, "Auto-encoding variational bayes," in International Conference on Learning Representation, arXiv, May 1, 2014, 14 pages.
Kingma et al, "Improving variational inference with inverse autoregressive flow," in Conference on Neural Information Processing Systems, arXiv, Jan. 30, 2017, 16 pages.
Larsson et al, "Learning representations for automatic colorization," in European Conference on Computer Vision (ECCV), arXiv, Aug. 13, 2017, 29 pages.
Levin et al, "Colorization using optimization," ACM Transactions on Graphics, 2004, 6 pages.
Morimoto et al, "Automatic colorization of greyscale images using multiple images on the web," ACM Transactions on Graphics, 2009, 1 pages.
Oord et al, "Conditional image generation with pixelCNN decoders," Conference on Neural Informaiton Processing Systems (NIPS), 2016, 9 pages.
Oord et al, "Pixel recurrent neural network," arXiv, Aug. 19, 2016, 11 pages.
PCT International Search Report and Written Opinion in the International Appln. No. PCT/US2018/033676, dated Sep. 3, 2018.
Polyak et al, "Acceleration of stochastic approximation by averaging," SIAM Journal on Control and Optimization, Jul. 1992, 18 pages.
Salimans et al, "PixelCNN++: A PixelCNN implementation with discretized logistics mixture likelihood and other modifications," International Conference on Learning Representation (ICLR), arXIv, Jan. 19, 2017, 10 pages.
Salimans et al, "Weight normalization: a simple reparameterization to accelerate training of a deep neural networks," Conference on Neural Information Processing Systems (NIPS), 9 pages.
Shang et al, "Understanding and improving convolutional neural networks via concatenated rectified linear units," International Conference on Machine Learning (ICML), arXiv, Jul. 19, 2016, 17 pages.
tinyclouds.org [online], "Automatic Colorization," dated Jan. 2016, [retrieved on Aug. 6, 2018}, retrieved from: URL<https://web.archive.org/web/20170516084208/http://tinyclouds.org/colorize/>, 13 pages.
Van der Horst et al, "Spatiotemporal chromaticity discrimination," Journal of the Optical Society of America (JOSA), Nov. 1969, 59(11), 7 pages.
wikipedia.com [online]," Colorfulness," Nov. 20, 2016, [retrieved on Sep. 16, 2019], retrieved from: URL <https://ipfs.io/ipfs/QmXoypizjW3WknFiJnKLwHCnL72vedxjQkDDP1mXWo6uco/wiki/Colorfulness.html>, 4 pages.
Yu et al, "Multi-scale context aggregation by dilated convolutions," in International Conference on Learning Representations (ICLR), arXiv, Apr. 30 , 2016, 13 pages.
Zhang et al, "Colorful image colorization," arXiv, submitted Mar. 28, 2016, 25 pages.

* cited by examiner

TRANSFORMING GRAYSCALE IMAGES INTO COLOR IMAGES USING DEEP NEURAL NETWORKS

CROSS REFERENCE TO RELATED APPLICATIONS

This application is a National Stage Application under 35 U.S.C. §371 and claims the benefit of International Application No. PCT/US2018/033676, filed on May 21, 2018, which claims priority to U.S. Provisional Application Ser. No. 62/508,874, filed on May 19, 2017. The disclosure of the prior application is considered part of and is incorporated by reference in the disclosure of this application.

BACKGROUND

This specification relates to processing images using deep neural networks, e.g., convolutional neural networks.

Convolutional neural networks generally include convolutional neural network layers and, in some cases, fully-connected neural network layers. Convolutional neural network layers have sparse connectivity, with each node in a convolutional layer receiving input from only a subset of the nodes in the next lowest neural network layer. Some convolutional neural network layers have nodes that share weights with other nodes in the layer. Nodes in fully-connected layers, however, receive input from each node in the next lowest neural network layer.

SUMMARY

This specification describes an image processing system implemented as computer programs on one or more computers in one or more locations that transforms a grayscale image into a color image using deep neural networks.

In particular, the system includes a coloring neural network configured to receive a first grayscale image having a first resolution, and process the first grayscale image to generate a first color image that has a second resolution lower than the first resolution. In some implementations, the coloring neural network includes an auto-regressive image generation neural network.

The system includes a refinement neural network configured to receive a set of intermediate image outputs, and process the set of intermediate image outputs to generate a second color image that has a third resolution higher than the second resolution. In some implementations, the refinement neural network includes a feedforward convolutional neural network.

The system further includes a subsystem configured to receive the first grayscale image as an input, and to provide the first grayscale image to the coloring neural network to obtain the first color image. The subsystem is further configured to process the first color image to generate a set of intermediate image outputs, and to provide the set of intermediate image outputs as input to the refinement neural network to obtain as output the second color image. In some implementations, the third resolution is the same as the first resolution.

The subject matter described in this specification can be implemented in particular embodiments so as to realize one or more of the following advantages. The systems described in this specification can generate color images from grayscale images faster than other systems while generating color images that are of comparable or even better quality (e.g., color images that are shown, e.g. through use of a Visual Turing Test (VTT), to be more plausible than those generated by the other systems). In particular, by first using a coloring neural network to produce low resolution color images from grayscale images and then converting the low resolution color images to high resolution color images using a refinement neural network, the systems described in this specification can generate a final color image in less time and while consuming fewer computational resources, e.g., memory and processing power, than conventional systems that attempt to directly convert the original grayscale image to a color image while still generating diverse and plausible color images. For example, the described approach reduces the need to generate intermediate full-resolution outputs, e.g., sepia toned outputs, resulting in reduced complexity and using fewer computational resources.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
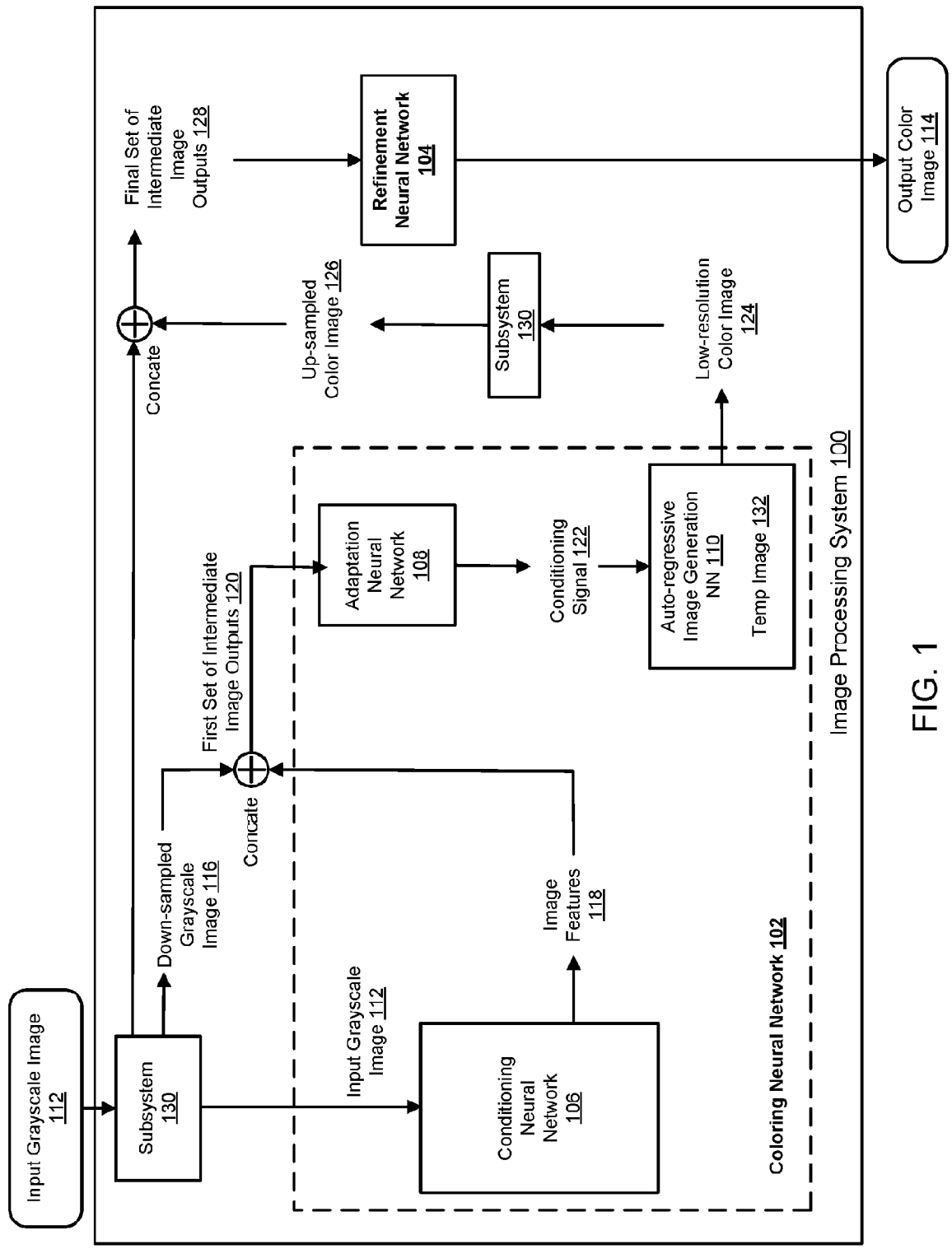
FIG. 1 shows an example image processing system.

FIG. 1 shows an example image processing system 100. The image processing system 100 is an example of a system implemented as computer programs on one or more computers in one or more locations, in which the systems, components, and techniques described below can be implemented.

The image processing system 100 is configured to receive an input grayscale image (i.e., a black and white image) and to generate an output color image from the input grayscale image. The output color image is a plausible color version of the input grayscale image. That is, the output color image shows the same scene as the input grayscale image but depicts the scene using the colors that would naturally be observed in the scene by a human. Generally, the image processing system 100 receives an input grayscale image, generates a low-resolution color image, and then uses the low-resolution color image in combination with the original grayscale image to generate the high-resolution output color image.

The image processing system 100 is useful in many situations where grayscale images need to be converted to color images. As an example, the system 100 can be used to restore old photographs or videos. As another example, the system 100 can be used to assist cartoon artists to color their drawings.

As shown in FIG. 1, the image processing system 100 can receive an input grayscale image 112 and generate an output color image 114, which is a plausible color version of the input grayscale image 112. To perform this task, the image processing system 100 includes a coloring neural network 102, a refinement neural network 104, and a subsystem 130. Generally, the coloring neural network 102 is trained to generate a low-resolution color image for the input grayscale image 112. Then, given the generated low-resolution color image and the original input grayscale image 112, the refinement neural network 104 is trained to generate a high-resolution color image for the input grayscale image 112.

In particular, the coloring neural network 102 includes a conditioning neural network 106, an adaptation neural network 108, and an auto-regressive image generation neural network 110.

The subsystem 130 receives the input grayscale image 112 as input and provides the input grayscale image 112 to the conditioning neural network 106.

The conditioning neural network 106 is configured to receive the input grayscale image 112 and to process the input grayscale image 112 to generate image features 118 of the input grayscale image 112.

The conditioning neural network 102 is a convolutional neural network, e.g., a convolutional neural network with residual connections (e.g., one or more ResNet neural networks). For example, the conditioning neural network 102 can be a neural network that has been pre-trained on an image processing task, e.g., an image segmentation task, and the features 118 can be the output of a predetermined convolutional layer of the multiple layers in the conditioning neural network 102.

The subsystem 130 down-samples the input grayscale image 112 to generate a down-sampled grayscale image 116 having a down-sampled resolution much lower than an original resolution of the input grayscale image 112. For example, the input grayscale image 112 may have an original resolution of 224 pixels×224 pixels. The down-sampled grayscale image 116 may have a down-sampled resolution of 28 pixels×28 pixels.

The subsystem 130 concatenates the image features 118 generated by the conditioning neural network 106 and the down-sampled grayscale image 116 to generate a first set of intermediate image outputs 120. At least one output in the first set of intermediate image output 120 has the down-sampled resolution.

The subsystem 130 provides the first set of intermediate image outputs 120 to the adaptation neural network 108.

The adaptation neural network 108 is configured to receive the first set of intermediate image outputs 120 and to process the first set of intermediate image outputs 120 to generate a conditioning signal 122 (e.g., a Tensor). In particular, the adaptation neural network 108 is configured to adapt the down-sampled resolution and image features included in the first set of intermediate image outputs 120 to generate the conditioning signal 122. The adaptation neural network 108 then provides the conditioning signal to the auto-regressive image generation neural network 110 for further processing.

In general, the adaptation neural network 108 includes one or more convolutional neural network layers.

The auto-regressive image generation neural network 110 is configured to receive the conditioning signal 122 from the adaptation neural network 108 and to process the conditioning signal 122 to generate a low-resolution color image 124 having the down-sampled resolution (e.g., 28 pixels×28 pixels). The auto-regressive image generation neural network 110 can be a fully convolutional neural network that is made up of multiple convolutional neural network layers. In particular, the auto-regressive image generation neural network 110 can include multiple masked convolutional layers, with at least some of the masked convolutional layers using a gated activation function that is conditioned on the conditioning signal 122. An example architecture for the auto-regressive image generation neural network 110 and example techniques for conditioning convolutional neural network layers on a conditioning signal are described in Aaron van den Oord, Nal Kalchbrenner, Oriol Vinyals, Lasse Espeholt, Alex Graves, Koray Kavukcuoglu, "Conditional Image Generation with PixelCNN Decoders," arXiv: 1606.05328, 2016.

Specifically, the auto-regressive image generation neural network 110 generates a temporary image 132 based on the conditioning signal 122. The temporary image 132 includes a predetermined number of pixels arranged in a two-dimensional map such that the resolution of the temporary image is equal to the down-sampled resolution of the down-sampled grayscale image 116.

The auto-regressive image generation neural network 110 then sequentially colorizes pixels of the temporary image 132 to generate the low-resolution color image 124. That is, the auto-regressive image generation neural network 110 orders the pixels in the temporary image 132 into a sequence and then generates the color values for each pixel in the temporary image 132 one by one in the order according to the sequence. For example, the sequence may start at the top left corner of the temporary image and proceed row by row through the temporary image 132, with the last pixel in the sequence being the pixel in the bottom right corner of the temporary image.

The auto-regressive image generation neural network 110 colorizes pixels of the temporary image by determining, for each pixel of the temporary image, a respective color value for each of multiple color channels based on pixels that were previously colored and conditioned on the conditioning signal.

The process for generating the low-resolution color image 124 is described in more detail below with reference to FIG. 2.

The image processing system 100 includes a subsystem 130 configured to process the low-resolution color image 124 to generate a final set of intermediate image outputs, and to provide the final set of intermediate image outputs as input to the refinement neural network 104. The final set of intermediate image outputs may be generated from an up-sampled version of the low-resolution color image 126 and the input greyscale image 112. More specifically, the final set of intermediate image outputs may be generated by concatenating the up-sampled version of the low-resolution color image 126 and the input greyscale image 112.

In particular, the subsystem 130 up-samples the low-resolution color image 124 to generate an up-sampled version of the color image 126 (which may be referred to as the up-sampled color image 126) having an up-sampled resolution that is higher than the down-sampled resolution. For example, the subsystem may use bilinear or nearest neighbor interpolation methods to up-sample the low-resolution color image 124. The subsystem 130 then concatenates the up-sampled color image 126 with the input grayscale image 112 to generate the final set of intermediate image outputs 128. At least one image output in the final set of intermediate image outputs 128 has the up-sampled resolution. The subsystem 130 provides the final set of intermediate image outputs 128 to the refinement neural network 104 for further processing.

The refinement neural network 104 receives the final set of intermediate image outputs 128 from the subsystem 130 and processes the final set of intermediate image outputs 128 to generate the output color image 114. In particular, processing the final set of intermediate image outputs 128 includes combining the chrominance of the up-sampled color image with the original luminance channel of the input grayscale image to generate the output color image 114. The output color image 114 has an up-sampled resolution that is much higher than the down-sampled resolution. For example, the up-sampled resolution can be equal to the original resolution of the input grayscale image 112 (e.g., 224 pixels×224 pixels).

The refinement neural network 104 is a feedforward convolutional neural network that is made of multiple convolutional neural network layers. For example, the refinement neural network 104 includes multiple Conv2D neural network layers.

The auto-regressive image generation neural network 110 can be trained jointly with the conditioning neural network 106 and the adaptation neural network 108 to predict a low-resolution color image from an input grayscale image. That is, the system 100 can adjust the values of parameters of the neural networks 110, 106, and 108 to optimize the same objective function. The system 100 can train the neural networks 110, 106, and 108 using maximum likelihood with a cross-entropy loss per pixel. If the conditioning neural network was pre-trained on a different task, the system can begin the joint training starting from pre-trained values of the parameters of the conditioning neural network.

The refinement neural network 104 is trained separately from the coloring neural network 102. In particular, during training, the system 100 can obtain one or more input examples each including: (i) an input grayscale image having an original resolution, (ii) a down-sampled color image having a down-sampled resolution lower than the original resolution, and (iii) a ground-truth color image corresponding to the input grayscale image (the ground-truth color image having the same original resolution as the input grayscale image). The system 100 can process the input grayscale image and the down-sampled color image using the refinement neural network 104 to generate a training color image having the original resolution. The system 100 then adjusts values of the parameters of the refinement neural network to maximize the likelihood that the training color image is the same as the ground-truth color image. The system 100 can repeatedly perform these operations on multiple input examples to train the refinement neural network, i.e., to iteratively update the values of the parameters of the refinement neural network.

The image processing system 100 described in this specification can generate color images from grayscale images faster than other systems while ensuring that the generated color images have comparable or even better quality (e.g., more plausible). Conventional systems that use auto-regressive neural networks to generate high-resolution color images are slow due to the inherently sequential (auto-regressive) structure of these neural networks. In contrast, the image processing system 100 uses the auto-regressive image generation neural network 110 to generate a color image having a resolution much lower than that of the original input grayscale image. This low-resolution color image can be generated quickly. Given the fact that the chrominance of an image is of much lower spatial frequency than the luminance (i.e., brightness) of the image, it is sufficient for the auto-regressive image generation neural network 110 to predict chrominance for the low-resolution color image. To ensure that the output color image has high quality, the system 100 up-samples the low-resolution color image and refines the up-sampled color image using the refinement neural network 104. The refinement neural network 104 is trained to combine the chrominance of the up-sampled color image with the original luminance channel of the input grayscale image to generate a plausible, high-resolution color image as the final output. That is, the refinement neural network 104 is trained to learn a combination of the chrominance and the original luminance channel that results in a plausible, high-resolution color image as the final output.

Figure 2:
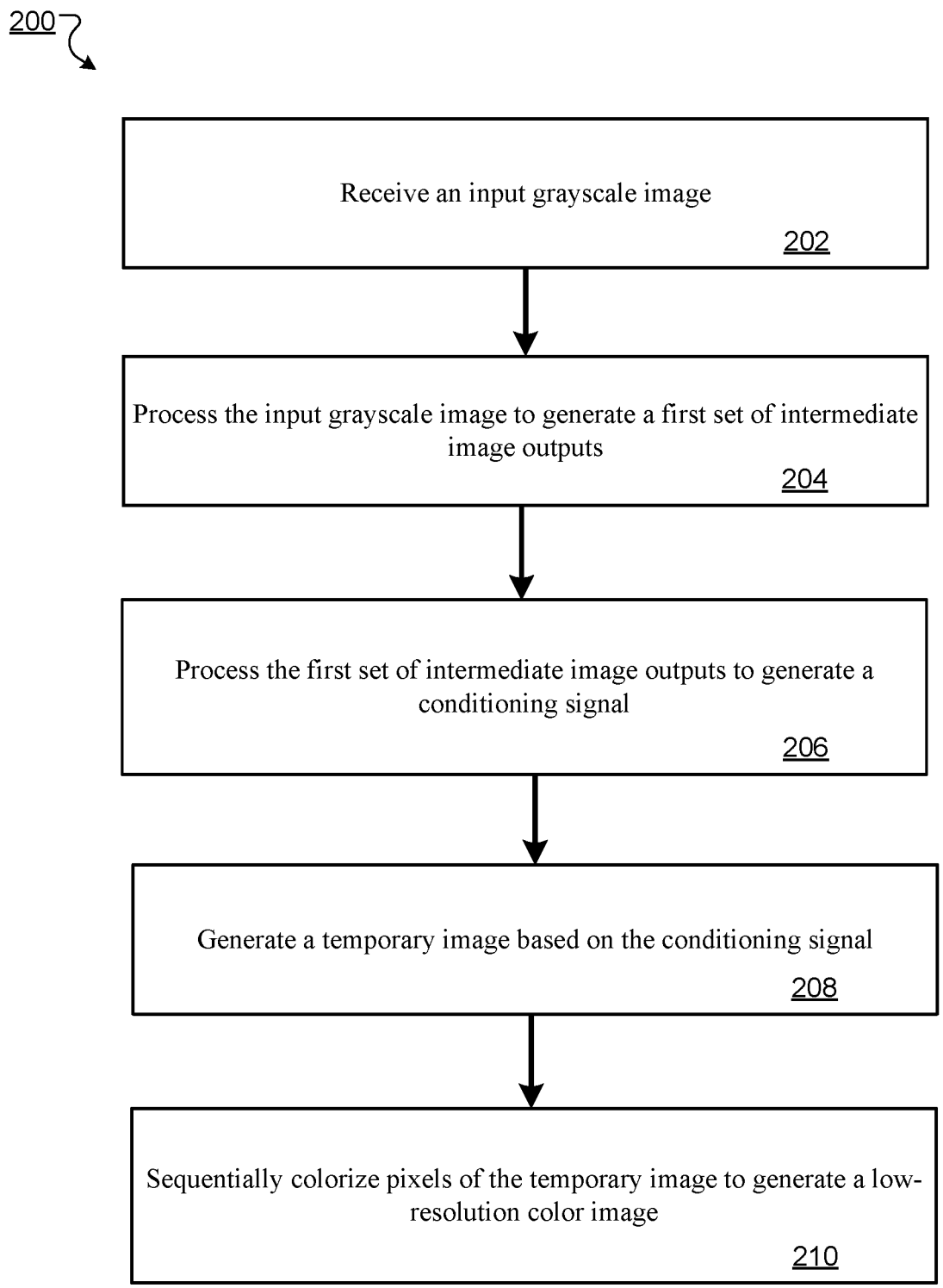
FIG. 2 is a flow diagram of an example process for generating a low-resolution color image from a full-resolution input grayscale image.

FIG. 2 is a flow diagram of an example process 200 for generating a low-resolution color image from an input grayscale image. For convenience, the process 200 will be described as being performed by a system of one or more computers located in one or more locations. For example, an image processing system, e.g., the image processing system 100 of FIG. 1, appropriately programmed, can perform the process 200.

The system receives an input grayscale image (step 202). The input grayscale image has a first resolution, e.g., 224 pixels×224 pixels.

The system processes the input grayscale image to generate a first set of intermediate image outputs (step 204).

In particular, the system processes input grayscale image to generate image features of the input grayscale image using a conditioning neural network (e.g., the conditioning neural network 106 of FIG. 1). The system down-samples the input grayscale image to generate a down-sampled grayscale image having a second resolution that is much lower than the first resolution. For example, the second resolution may be 28 pixels×28 pixels. The system concatenates the image features and the down-sampled grayscale image to generate a first set of intermediate image outputs.

The system processes the first set of intermediate image outputs to generate a conditioning signal using an adaptation neural network, e.g., the adaptation neural network 108 of FIG. 1 (step 206).

The system generates a temporary image based on the conditioning signal (step 208).

Specifically, the system generates a temporary image using an auto-regressive image generation neural network (e.g., the auto-regressive image generation neural network 110 of FIG. 1). The temporary image includes a predetermined number of pixels arranged in a two-dimensional map such that the resolution of the temporary image is equal to the second resolution of the down-sampled grayscale image.

The system sequentially colorizes pixels of the temporary image to generate a low-resolution color image using the auto-regressive image generation neural network (step 210).

In particular, the auto-regressive image generation neural network orders the pixels in the temporary image into a sequence and then generates the color values for each pixel in the temporary image one by one in the order according to the sequence. For example, the sequence may start at the top left corner of the temporary image and proceed row by row through the temporary image, with the last pixel in the sequence being the pixel in the bottom right corner of the temporary image.

The auto-regressive image generation neural network colorizes pixels of the temporary image by determining, for each pixel of the temporary image, a respective color value for each of multiple color channels based on pixels that were previously colored and conditioned on the conditioning signal.

For example, assuming that the system aims to output a final color image that includes a luminance channel and two color channels, e.g., an Y channel (luminance channel), a Cb channel (blue channel) and a Cr channel (red channel), the auto-regressive image generation neural network determines color values of the pixels of the temporary image using the following conditional probability model:

$$p(y \mid x) = \prod_i p(y(i, r) \mid y(1:i-1, :), x) p(y(i, b) \mid y(i, r), y(1:i-1, :), x) \quad \text{(Eq. 1)}$$

where x denotes the conditioning signal characterizing the input grayscale image, y denotes a colorized version of the temporary image to be generated, i is the index of $i^{th}$ pixel in the sequence, y(i, r) is the color value for Cr channel for pixel i, y(i, b) is the color value for Cb channel for pixel i. p(y|x) denotes a conditional probability distribution over possible colorized versions of the temporary image that could be generated given the conditioning signal x.

The first term in Eq. 1, p(y(i, r)|y(1:i−1,:),x), represents a conditional multinominal distribution over possible Cr values for pixel i given the conditioning signal x and previously colored pixels (i.e., pixel 1 to pixel i−1).

The second term in Eq. 1, p(y(i, b)|y(i, r), y(1:i−1,:),x) represents a conditional multinominal distribution over possible Cb values for pixel i given (a) the color value for Cr channel for pixel i, (b) previously colored pixels (i.e., pixel 1 to pixel i−1), and (c) the conditioning signal x.

To determine color values of pixels of the temporary image, the auto-regressive image generation neural network sequentially samples the color values for each pixel i. The Cr value of pixel i is sampled according to the first term and the Cb value of pixel i is sampled according to the second term of Eq. 1.

In some implementations, the first term and the second term can be presented based on a logistic mixture model.

Figure 3:
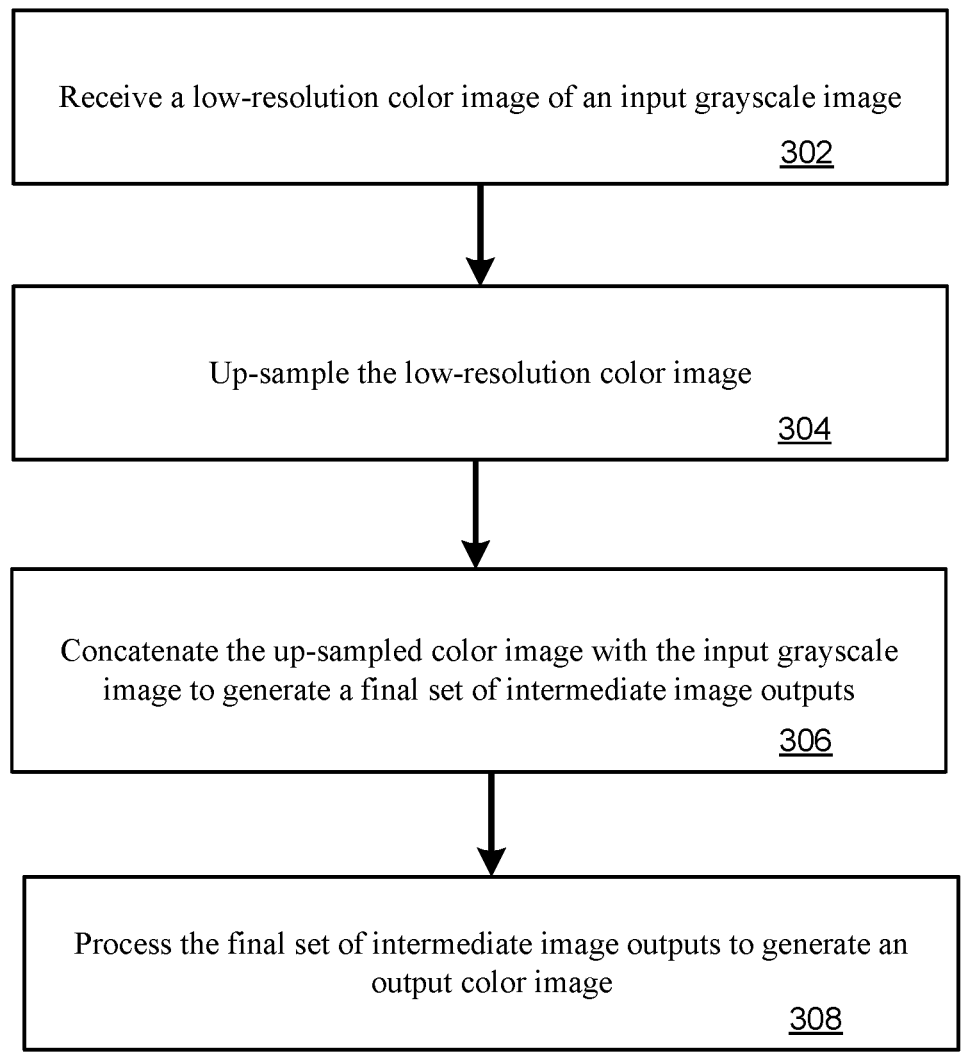
FIG. 3 is a flow diagram of an example process for generating a high-resolution output color image from a low-resolution color image of an input grayscale image.

FIG. 3 is a flow diagram of an example process 300 for generating an output color image from a low-resolution color image of an input grayscale image. For convenience, the process 300 will be described as being performed by a system of one or more computers located in one or more locations. For example, an image processing system, e.g., the image processing system 100 of FIG. 1, appropriately programmed, can perform the process 300.

The system receives a low-resolution color image of an input grayscale image (step 302). The low-resolution color image has a second resolution much lower than a first resolution of the input grayscale image. For example, the input grayscale image has a resolution of 224 pixels×224 pixels. The low-resolution color image may have a resolution of 28 pixels×28 pixels.

The system up-samples the low-resolution color image to generate an up-sampled color image (step 304). For example, the system can up-sample the low-resolution color image using bilinear or nearest neighbor interpolation methods. The up-sampled color image has a third resolution higher than the second resolution. For example, the third resolution is equal to the first resolution, e.g., 224 pixels× 224 pixels.

The system concatenates the up-sampled color image with the input grayscale image to generate a final set of intermediate image outputs (step 306).

The system processes the final set of intermediate image outputs to generate an output color image using a refinement neural network, e.g., the refinement neural network 104 of FIG. 1 (step 308). During the processing of the final set of intermediate image outputs, the refinement neural network 104 combines the chrominance of the up-sampled color image with the original luminance channel of the input grayscale image to generate the output color image that has a high resolution, e.g., the same resolution as the input grayscale image.

The process 300 can be performed during training of the refinement neural network to generate a high-resolution color image from a low-resolution color image and an input grayscale image.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising one or more computers and one or more storage devices storing instructions that, when executed by one or more computers, cause the one or more computers to implement:
   a coloring neural network configured to:
      receive a first grayscale image, the first grayscale image having a first resolution, and
      process the first grayscale image to generate a first color image that has a second resolution lower than the first resolution;
   a refinement neural network configured to:
      receive a final set of intermediate image outputs, and
      process the final set of intermediate image outputs to generate a second color image that has a third resolution higher than the second resolution; and
   a subsystem configured to:
      receive the first grayscale image as an input,
      provide the first grayscale image to the coloring neural network to obtain the first color image,
      process the first color image to generate the final set of intermediate image outputs, and
      provide the final set of intermediate image outputs as input to the refinement neural network to obtain as output the second color image.

2. The system of claim 1, wherein the final set of intermediate image outputs is generated from the first greyscale image and an up-sampled version of the first color image.

3. The system of claim 2, wherein the final set of intermediate image outputs is generated by concatenating the up-sampled version of the first color image and the first greyscale image.

4. The system of claim 1, wherein the up-sampled version of the first color image has the third resolution higher than the second resolution.

5. The system of claim 1, wherein the coloring neural network comprises an auto-regressive image generation neural network.

6. The system of claim 5, wherein:
   the coloring neural network comprises:
      a conditioning neural network configured to:
         receive the first grayscale image, and
         process the first grayscale image to generate a set of image features of the first grayscale image;
      an adaptation neural network; and
      an auto-regressive image generation neural network; and
   wherein the subsystem is further configured to:
      after receiving the first grayscale image having the first resolution as the input, down-sample the first grayscale image to generate a down-sampled first grayscale image having the second resolution,
      receive the set of image features from the conditioning neural network,
      concatenate the set of image features with the down-sampled first grayscale image to generate a first set of intermediate image outputs, at least one output in the first set of intermediate image outputs having the second resolution,
      provide the first set of intermediate image outputs as input to the adaptation neural network to obtain a conditioning signal, and
      provide the set of conditioning signals as input to the autoregressive image generation neural network to obtain the first color image having the third resolution higher than the second resolution; and
   wherein the adaptation neural network is configured to:
      receive the first set of intermediate image outputs, and
      process the first set of intermediate image outputs to generate a conditioning signal;
   wherein the auto-regressive image generation neural network is configured to:
      receive the conditioning signal,
      generate a temporary image based on the conditioning signal, the temporary image having the second resolution,
      sequentially color pixels of the temporary image to generate the first color image, the color of each pixel being determined based on pixels of the temporary image that were previously colored and conditioned on the conditioning signal.

7. The system of claim 6, wherein the color of each pixel is determined based on chrominance of the previously colored pixels.

8. The system of claim 6, wherein the color of each pixel is determined based on a multinomial distribution over a predetermined set of color channels.

9. The system of claim 6, wherein the color of each pixel is determined based on a logistic mixture model of a predetermined set of color channels.

10. The system of claim 6, wherein the conditioning neural network comprises a residual neural network.

11. The system of claim 10, wherein the residual neural network is a ResNet neural network.

12. The system of claim 1, wherein the refinement neural network comprises a feedforward convolutional neural network.

13. The system of claim 6, wherein the adaption neural network comprises a plurality of convolutional neural network layers.

14. The system of claim 6, wherein the auto-regressive image generation neural network has been jointly trained with the conditioning neural network and the adaptation neural network.

15. The system of claim 1, wherein:
   the subsystem is further configured to:
      after providing the first grayscale image to the coloring neural network to obtain the first color image having the second resolution, up-sample the first color image to generate an up-sampled first color image having the third resolution higher than the second resolution, and concatenate the up-sampled first color image with the first grayscale image to generate the final set of intermediate image outputs, at least one output of the final set of intermediate image outputs having the third resolution.

16. The system of claim 1, wherein the third resolution is the same as the first resolution.

17. One or more computer storage media storing instructions that, when executed by one or more computers, cause the one or more computers to implement a system comprising:
   a coloring neural network configured to:
      receive a first grayscale image, the first grayscale image having a first resolution, and
      process the first grayscale image to generate a first color image that has a second resolution lower than the first resolution;
   a refinement neural network configured to:
      receive a final set of intermediate image outputs, and process the final set of intermediate image outputs to generate a second color image that has a third resolution higher than the second resolution; and a subsystem configured to:
receive the first grayscale image as an input,
provide the first grayscale image to the coloring neural network to obtain the first color image,
process the first color image to generate the final set of intermediate image outputs, and
provide the final set of intermediate image outputs as input to the refinement neural network to obtain as output the second color image.

18. A method comprising:
processing a input grayscale image to generate an output color image using a neural network system, wherein the neural network system comprises:
a coloring neural network configured to:
receive the input grayscale image, the input grayscale image having a first resolution, and
process the input grayscale image to generate a first color image that has a second resolution lower than the first resolution;
a refinement neural network configured to:
receive a final set of intermediate image outputs, and
process the final set of intermediate image outputs to generate an output color image that has a third resolution higher than the second resolution; and
a subsystem configured to:
receive the input grayscale image as an input,
provide the input grayscale image to the coloring neural network to obtain the first color image,
process the first color image to generate the final set of intermediate image outputs, and
provide the final set of intermediate image outputs as input to the refinement neural network to obtain as output the output color image.

* * * * *

UNITED STATES PATENT AND TRADEMARK OFFICE
CERTIFICATE OF CORRECTION

| | | |
|---|---|---|
| PATENT NO. | : 11,087,504 B2 | Page 1 of 1 |
| APPLICATION NO. | : 16/494386 | |
| DATED | : August 10, 2021 | |
| INVENTOR(S) | : Cotado et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 122 days.

Signed and Sealed this
Seventh Day of February, 2023

Katherine Kelly Vidal
*Director of the United States Patent and Trademark Office*